United States Patent
Rundqwist et al.

[11] Patent Number: 5,528,119
[45] Date of Patent: Jun. 18, 1996

[54] METHOD AND APPARATUS FOR PHASE COMPENSATION IN A VEHICLE CONTROL SYSTEM

[75] Inventors: Lars Rundqwist; Bengt Sjööberg; Per-Olov Elgcrona; Robert Hillgren; Karin Ståhl-Gunnarsson, all of Linköping, Sweden

[73] Assignee: SAAB AB, Linkoping, Sweden

[21] Appl. No.: 326,517

[22] Filed: Oct. 20, 1994

[30] Foreign Application Priority Data

May 30, 1994 [SE] Sweden .................................. 9401847

[51] Int. Cl.⁶ .................................................. G05D 1/08
[52] U.S. Cl. ...................... 318/632; 318/609; 318/610; 364/163; 364/433; 244/182
[58] Field of Search .................. 318/560–696; 364/150–179, 428, 430, 433, 434; 244/183, 185, 182

[56] References Cited

U.S. PATENT DOCUMENTS

| | | | |
|---|---|---|---|
| 3,691,354 | 9/1972 | Green et al. | 364/161 |
| 3,840,200 | 10/1974 | Lambregts | 244/182 |
| 3,892,374 | 7/1975 | Lambregts | 244/182 |
| 3,908,934 | 9/1975 | Schlo'eman | 244/182 |
| 3,934,221 | 1/1976 | Bateman et al. | 340/970 |
| 3,958,218 | 5/1976 | Bateman | 340/970 |
| 3,958,219 | 5/1976 | Bateman | 340/970 |
| 4,189,118 | 2/1980 | Peter-Contesse | 244/182 |
| 4,189,119 | 2/1980 | Peter-Contesse et al. | 244/182 |
| 4,212,444 | 7/1980 | Stephan | 244/182 |
| 4,672,548 | 6/1987 | Greeson et al. | 364/433 |
| 4,709,336 | 11/1987 | Zweifel | 364/433 |
| 4,792,799 | 12/1988 | Grove | 340/970 |
| 5,119,288 | 6/1992 | Hiroi | 364/163 |

OTHER PUBLICATIONS

J. J. Buchholz, "Time delay induced by Control Surface Rate Saturation", Z. Flugwiss, Weltraumforsch. 17 (1993), pp. 287–293, Springer–Verlag 1993.

P. R. Deppe, Calspan Final Report No. 8091-1, "Flight Evaluation of A Software Rate Limiter Concept", Mar. 1993, Calspan Advanced Technology Center, pp. 1–5.

C. R. Chalk, "Study of a Software Rate Limit Concept", FRM No. 636, IR&D No. 85–892, 28 Oct. 1992, Calspan Advanced Technology Center.

*Primary Examiner*—Paul Ip
*Attorney, Agent, or Firm*—Lowe, Price, LeBlanc & Becker

[57] ABSTRACT

The present invention relates to a method and a device for executing phase compensation in a control system of a motor-driven vehicle, in which the time derivative for an output signal (y) from a circuit (1) contained in the control system is limited relative to the time derivative for an input signal (u) to the circuit (1) if the time derivative for the input signal (u) exceeds a predetermined value. A difference signal ($\epsilon$) is formed between the output signal (y) and a signal (x) present in the circuit (1), the time derivative of which is not limited in relation to the time derivative for the input signal (u). The difference signal ($\epsilon$) is filtered via an asymptotically stable filter (3) to form a signal ($\delta$), which is fed back and added to the input signal (u) of the circuit (1) to form the signal (x). A conventional rate limiter may be used to form the output signal (y) from the signal (x).

14 Claims, 6 Drawing Sheets

METHOD AND APPARATUS FOR PHASE COMPENSATION IN A VEHICLE CONTROL SYSTEM

TECHNICAL FIELD

This invention relates to a method for executing phase compensation in a control system of a motor-driven vehicle, in which a time derivative for an output signal from a circuit contained in the control system is limited relative to a time derivative for an input signal to the circuit, if the time derivative for the input signal exceeds a predetermined value. The invention also relates to apparatus for executing phase compensation in the control system of a motor-driven vehicle, which includes a circuit comprising limiting means for limiting the time derivative of an output signal in relation to the time derivative for an input signal to the circuit, if the time derivative for the input signal exceeds a predetermined value, set by the limiting means.

BACKGROUND ART

All (vehicle) control systems have physical actuators, e.g., electrical motors, hydraulic servo valves, etc. These actuators all have rate limits due to limits in power supply, hydraulic pressure, etc. Thus, all control systems inherently include restrictions with regard to the rate at which a new command from the driver of the vehicle, i.e., a change in the input signal into the control system, can give rise to corresponding changes in the physical output signal from the control system. If the time derivative for the input signal exceeds a certain value, the time derivative for the output signal is limited in relation to the time derivative for the input signal. This limitation is known as the rate limitation of the control system. When very rapid changes in the input signal are executed, for example when the input signal to the control system consists of an excessively rapid (or large) sinusoidal signal, a phase shift occurs between the input signal and the output signal. That is, the output signal is subject to a time delay in relation to the input signal. This phase shift leads to impairment of the performance of the vehicle and, in the worst case, can give rise to instability.

In aircraft applications, a so-called PIO (Pilot Induced Oscillation) can occur when an excessively rapid change in the input signal causes the rate limitation of the control system to be exceeded. This can occur if an unforeseen circumstance causes the pilot to execute rapid and large movements with the control stick of the aircraft. The phase shift which occurs because of the rate limitation of the control system amplifies the oscillations. In the worst case these oscillations become divergent, which can result in loss of control over the movements of the aircraft.

The aforementioned rate limitation is more noticeable in aircraft which constitute a so-called unstable system. In this type of aircraft, the rudders of the aircraft are affected not only by the signals from the pilot, but also by stabilization signals generated in the control system, which are dependent on values obtained from sensors at different points in the aircraft.

One way of reducing the aforementioned problems in control systems with rate limitation involves the introduction of phase compensation when the rate limitation is active. Such phase compensation must meet the following requirements:

A. reduce the phase retardation in the case of sinusoidal input signals;

B. minimize the dynamic retardation for rapid ramp and steps;

C. provide the same input and output signal when the input signals are sufficiently slow.

Two different methods of executing phase compensation in control systems with rate limitation are previously disclosed in Buchholz, J. J. (1993): "Time delay induced by Control Surface Rate Saturation", Zeitschrift f. Flugwissenschaften und Weltraumforschung, Springer Verlag, Vol. 17, pp. 287–293; A'harrah, R. C. (1992); "Communique with DLR and others", NASA HQ, Washington DC, July 14th, 1992; and Chalk, C. R. (1992): "Study of a Software Rate Limit Concept", Calspan Flight Research Memorandum 635, Buffalo, N.Y. These methods use logical conditions (if-then-else) to establish whether a phase compensation requires to be executed in the control system. However, these conditions call for a jump to be made between at least two different dynamic behaviors for the respective methods. Thus, input signals can always occur which give rise to an undesired output signal. For this reason, none of these methods is suitable to be implemented in a control system with rate limitation.

Disclosure of the Invention

It is accordingly an object of the present invention to overcome the deficiencies of the prior art and to provide method and apparatus for executing phase compensation in a control system with rate limitation.

It is a more particular object of the invention to provide a method which resolves the aforementioned problems in a prior art control system having a rate-limiting circuit, in a continuous fashion without jumping between different dynamic behaviors.

It is still a more specific object of the invention to provide a method for executing phase compensation for such systems by forming a difference signal between the output signal and a particular signal present in a circuit containing a limiting device, wherein the time derivative of the particular signal is not limited in relation to the time derivative for the input signal, by feeding back the difference signal via an asymptotically stable filter, and by adding the resulting filtered signal to the input signal of the circuit to form the signal whose time derivative is not limited.

It is still another object of the invention to provide a phase compensating apparatus for rate limited control systems including: obtaining a particular signal present in a first circuit containing a rate limiting device, wherein the time derivative of the signal is not limited in relation to the time derivative for the input signal, a first adder for obtaining a difference signal, representing a difference between the particular signal from the first circuit and the output signal; a feed-back filter for feeding back the difference signal; and a second adder, receiving the output of the feed-back filter, for adding the input signal of the first circuit to the signal from the feed-back filter to form the particular signal.

It is a further object of the invention to eliminate adverse influence of a high-frequency disturbance signal contained in the input, defined as frequencies above the bandwidth of the control system, by providing a method and apparatus for: avoiding (or reducing) a blocking effect for low frequency signals when high-frequency disturbances are present in the input signal; precluding imposition of rate limiting of the output signal unless the input signal has a rate exceeding the specified limit; and restricting the output signal such that it does not have a rate exceeding the specified limit, thereby to provide the same input and output signal when the input signals are sufficiently slow and to permit introduction of phase compensation when rate limitation is active.

It is still another object of the invention to provide method and apparatus for reducing prior art problems in control systems having rate limitation by: reducing phase retardation when sinusoidal input signals are provided; minimizing dynamic retardation for rapid ramps and steps in the input signals; providing the same input and output signals when the input signals are sufficiently slow; avoiding or reducing a blocking effect for low frequency signals when high frequency disturbances are present; and precluding imposition of rate limiting of the output signal unless the input signal has a rate exceeding a specified limit.

In recognition of the fact that the output signal is within a specified rate limit and that violations of the rate limit will only take place for high frequency signals, and since these signals usually do not require phase compensation, it is thus an object of the invention to use phase compensation achieved by the first circuit only on the low frequency part of the input signal, without limiting the output signal to have a rate within a specified rate limit.

It is accordingly another object of the invention to provide a method and apparatus for limiting the disturbing influence of a high-frequency disturbance signal on a phase compensating device which includes a first adder, a feed-back filter and a second adder as hereinabove described in a first rate limiting circuit, including the first rate limiting circuit in a second circuit having an input signal and an output signal, and further including in the second circuit a low-pass filter for eliminating the high frequency disturbing signal, and third and fourth adders, and by so arranging the second circuit that the input signal is fed to the low pass filter as well as to the third adder, which also receives the output signal of the low pass filter, the output signal of the low pass filter being the input signal of the first rate limiting circuit, so that the third adder forms a difference signal between the input signal to the second circuit and the input signal to the first rate limiting circuit, and so that the difference signal is fed together with the output signal from the first rate limiting circuit to the fourth adder, the fourth adder forming a sum signal which forms the output signal of the second circuit.

For such a system, it is a further object of the invention to limit the rate of the output signal such that it does not have a rate exceeding a specified limit.

Thus, it is an object of the invention to use phase compensation only on the low frequency part of the input signal, while providing rate limiting for high frequencies without phase compensation, and to provide equal rate limits for two limitations of the time derivative of an incoming signal.

Accordingly, it is a more specific object of the invention to provide in such an inventive apparatus a second rate limiting device for limiting a time derivative of an input signal thereof, and for feeding the sum signal from the fourth adder to the second rate limiting device which provides an output signal forming the output signal of the second circuit.

It is yet a further object of the invention to provide, in accordance with the object of limiting the disturbing influence of a high-frequency disturbance signal on a phase compensating device as hereinabove set forth, a method and apparatus in which the time derivative of an incoming signal is further limited by a further rate limiting device which receives the difference signal from the third adder as an input signal, and which generates an output signal, and for feeding the output signal from the further rate limiting device together with the output signal from the first rate limiting circuit to the fourth adder to form a sum signal, which forms the output signal of the second circuit.

In accordance with the above objects, in accordance with the invention, there is provided in a control system of a vehicle for providing an output signal (y) having a time derivative which is limited in relation to a time derivative of an input signal (u) if the time derivative for the input signal (u) exceeds a predetermined value, an improvement comprising means for providing phase compensation in the control system. The means includes primary rate limiting circuit means (1) for providing a signal (x) and for arranging the signal (x) to have a time derivative which is not limited in relation to the time derivative for the input signal (u). The primary rate limiting circuit means includes: difference means (5) for forming a difference signal ($\epsilon$) between the output signal (y) and the signal (x), feedback means for feeding back the difference signal ($\epsilon$) to the input of the primary rate limiting circuit means, the feedback means including an filter means (3) for producing a feedback signal ($\delta$), and adding means (4) for adding the feedback signal ($\delta$) to the input signal (u) and for outputting the signal (x).

In accordance with another object of the invention, the inventive system may further include high-frequency limiting means for limiting a disturbing influence of a high-frequency disturbance signal contained in the input signal. In such an embodiment, the high-frequency limiting means may comprise: low-pass filter means (8) connected for receiving the input signal, for eliminating the high-frequency disturbing signal from the input signal, and for providing a filtered input signal to the second adder means; third adding means (9) for receiving the input signal and the filtered input signal, and for forming a difference signal (u2) between the input signal and the filtered input signal; and fourth adding means (10) receiving the difference signal (u2) and the output signal (y) and generating a sum signal, the fourth adding means obtaining a sum of the output signal (y) and the difference signal (u2) for providing the sum signal as a modified output signal (y1) of the control system.

In accordance with still another object of the invention, such a system may further include a second rate limiter circuit means (11) for limiting the time derivative of a signal inputted thereto; the second rate limiter circuit means (11) receiving the modified output signal (y1) from the fourth adding means (10) as an input signal, and outputting a further rate-limited output signal (y2) as an output of the control system.

Alternatively, such a system may include further rate limiter circuit means (12) for limiting the time derivative of a signal inputted thereto. The further rate limiter circuit means (12) is connected for receiving the difference signal (u2) from the third adding means (9) as an input signal, and for outputting a rate-limited difference signal (y3) to the fourth adding means (10). In this configuration, the fourth adding means (10) is connected for generating the sum signal as a sum of the rate-limited difference signal (y3) and the output signal (y) to provide an output signal (y4) as an output of the control system.

In the control systems according to the invention, the feed-back filter means preferably comprises a low pass filter.

More specifically, the filter means may comprise a first order low pass filter having an amplification parameter K and a time constant $\tau$. In such a structure, the amplification parameter may preferably have a value in a range of 5 to 10.

The primary rate limiting circuit of the invention may include a rate limiter device, which receives the signal (x) as its input and which generates the output signal (y) as its output.

In accordance with the invention, the inventive control system may preferably operate for controlling aircraft.

In accordance with yet another object of the invention, there is provided a method for providing phase compensation in the control system, including the steps of: obtaining a signal (x) present in the primary rate limiting circuit, the signal (x) having a time derivative which is not limited in relation to the time derivative for the input signal (u); forming a difference signal ($\epsilon$) between the output signal (y) and the signal (x); filtering the difference signal ($\epsilon$) for producing a feedback signal ($\delta$); and adding the feedback signal ($\delta$) to the input signal (u) for forming the signal (x).

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWING

The accompanying drawings, incorporated into and forming a part of the specification, illustrate several aspects of a preferred embodiment of the present invention and, together with the description, serve to explain the principles of the invention. In the drawings.

BEST MODE FOR CARRYING OUT THE INVENTION

The invention is intended primarily for use in control of aircraft which constitute a so-called unstable system. It should be appreciated, however, that the concepts of the invention also extend to control systems in other types of motor driven vehicles, and may be applied thereto.

Figure 1:
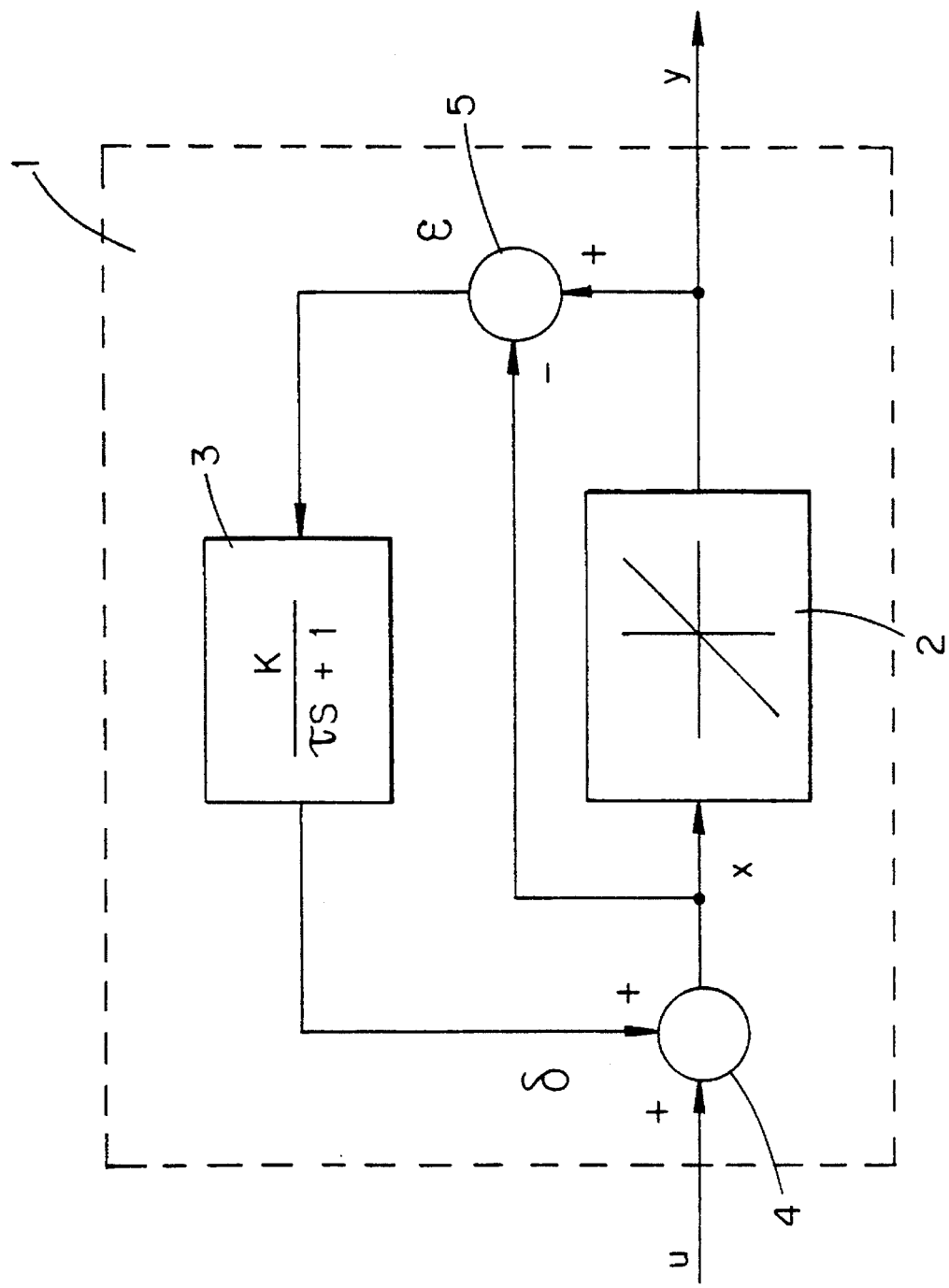
FIG. 1 shows a schematic block diagram representation of a first embodiment of a device according to the invention.

Referring now to the drawings, there is shown in FIG. 1 a first embodiment of a device according to the invention. A primary rate limiting circuit is generally referenced by a numeral 1 in FIG. 1. The inventive rate limiting circuit 1 generally comprises a structure for limiting the time derivative of an incoming signal u, and includes, for example, a rate limiter 2 and a feed-back filter 3. Filter 3 generates an output signal $\delta$.

Primary rate limiting circuit 1 also includes an adder 4, which receives as two inputs thereof the input signal u and the output signal $\delta$ of feed-back filter 3. Adder 4 produces a sum signal x, which is provided as the input signal to rate limiter 2.

Rate limiting circuit 1 also includes an additional adder 5, functioning as a subtractor. Adder 5 is connected between the output of rate limiter 2 and the feed-back filter 3. Adder 5 is connected to receive the output signal y from rate limiter 2, the input signal x which is provided to rate limiter 2 as an output from adder 4, and to produce a difference signal $\epsilon$ which is inputted to feed-back filter 3. As is seen in FIG. 1, the output signal y of rate limiter 2 is also the output signal of the primary rate limiting circuit 1.

As is appreciated by those of ordinary skill in the art, a rate limiter device activates itself when an input signal provided thereto has too large a time derivative, or rate. The (rate limited) output then tries to catch up with the input, but at a limited rate, until the two are again equal. Thus, whenever the input and output are unequal, the rate limiter device has activated itself. Further, when the input x and output y to the rate limiter 2 of FIG. 1 are unequal, the resulting difference signal $\epsilon$ is nonzero, thus closing the feedback loop and activating the feed-back filter 3. When the difference signal $\epsilon$ is again zero, feedback is interrupted, and is no longer active.

Operation of the embodiment of FIG. 1 may be understood from the following description thereof.

In accordance with the presently preferred embodiment of the invention and for simplicity of comprehension, feedback filter 3 comprises a low-pass filter of a conventional type, e.g., a filter having the transfer function:

$$G(s)=K/(s\tau+1)$$

where K represents an amplification factor of the filter 3 and $\tau$ is its time constant. Under normal conditions, an input signal changes more slowly than the limitation applicable to the time derivative of the input signal. Thus, in a normal case, neither the rate limiter 2 nor the feed-back filter 3 will be activated in the device according to the invention.

When the input signal $\epsilon$ to the filter is zero, i.e. when the difference signal $\epsilon$ between the output signal y and the input signal x to the rate limiter 2 is zero, the feed-back is interrupted. It is important, therefore, for the feed-back filter 3 to be truly stable, and for the output signal $\delta$ from that filter 3 to decay towards zero when the input signal $\epsilon$ to the filter is zero.

When the change in the input signal u exceeds the permissible rate, the signal $\epsilon$ will be different from zero. Indeed, if the input signal $\epsilon$ is increasing, the difference signal $\epsilon$ will be negative, because the output signal y from the rate limiter will not be capable of following the input signal u when the time derivative for the output signal is limited. Thus, the input signal x to rate limiter 2 will be larger than the output signal y, and the output difference signal $\epsilon$ of adder 5 will be negative. As a result, the output signal $\delta$ of the filter 3 thus also becomes negative, thus decreasing the input signal x to rate limiter 2 to a value smaller than the input signal u.

If the change in the input signal u reduces to a level within the permissible rate limit, or changes direction, the output signal y will follow the new input signal practically immediately, since the input signal x of the rate limiter will have been established at a value just outside the limit. This means that phase displacement due to rate limitation is essentially eliminated by the invention.

The object of providing phase compensation in a continuous fashion is solved by the above described mode of operation. If-then-else constructs are not necessary, since phase compensation is automatically engaged when the difference signal ε becomes nonzero and the output signal δ of the feedback filter starts building up. The phase compensation is similarly disengaged in a continuous fashion when ε is zero and δ has decayed to zero.

Figure 5:
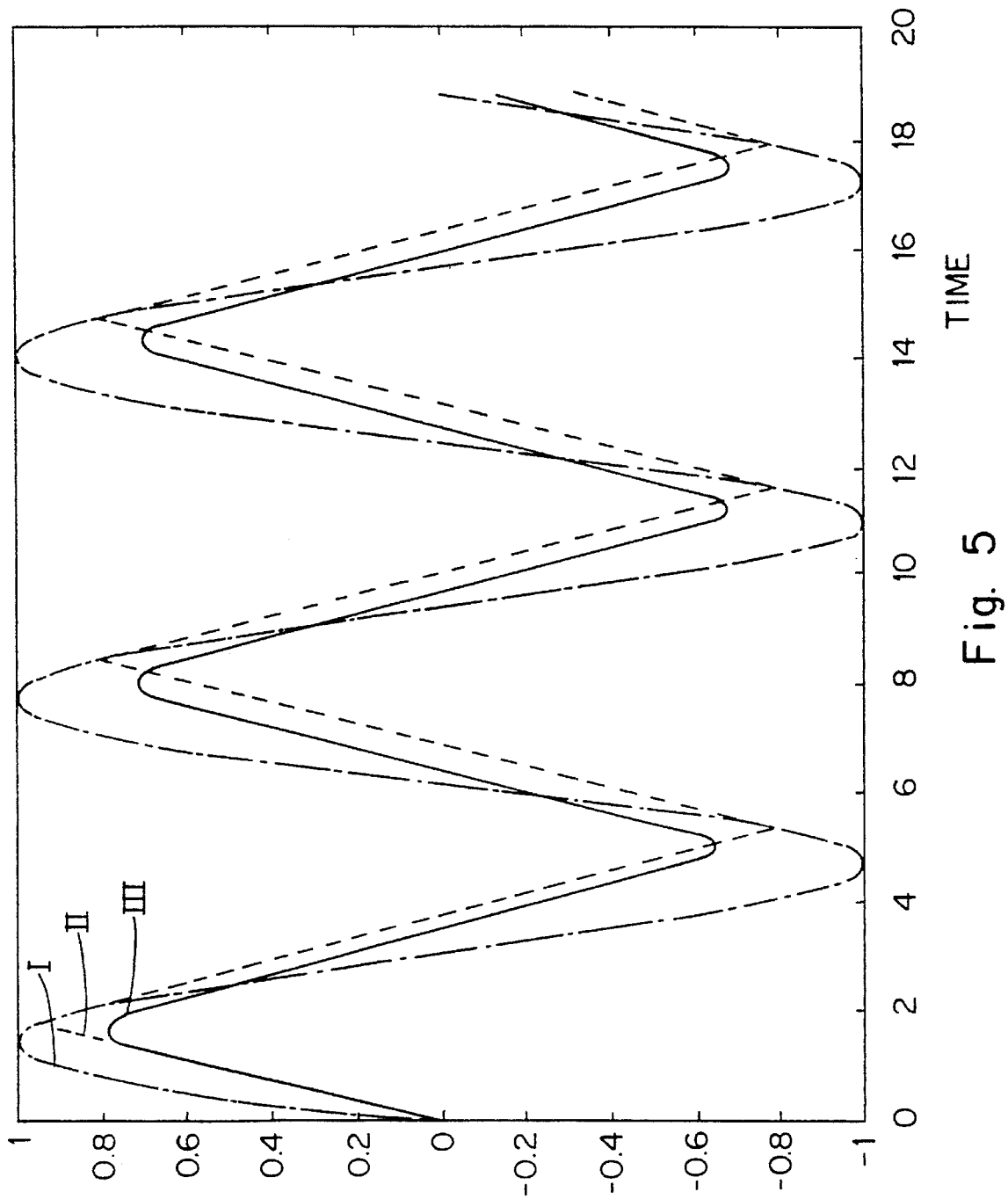
FIG. 5 illustrates the phase compensation of the first embodiment of the invention.

The resulting output signal after phase compensation is shown as a solid curve III in FIG. 5. The dash-dotted curve I represents the input signal u at a speed too high for the rate limiter. The figure also contains a dashed curve II, which represents an output signal from a conventional rate limiter, i.e. the signal obtained without the feed-back implemented in accordance with the invention.

As will be appreciated from a comparison of the curves of FIG. 5, the amplitude of the output signal y is reduced by the phase compensation. However, the phase displacement between input and output is clearly reduced, resulting in an output signal which is substantially in phase with the input signal. As a result, a driver or pilot will experience a more immediate response to a command.

As above noted, for the sake of simplicity the feed-back filter 3 has been illustrated as including a low-pass filter of the first order. In order for good results to be achieved, it is important to set the parameters of the filter at appropriate values.

For example, the amplification K of the filter should preferably be in a range between 5–10, for example. Otherwise, the phase compensation will be too low at smaller amplifications.

The choice of the time constant τ is governed partly by the frequency interval of interest for a particular application, and partly by how quickly the output signal from the feed-back filter must decrease upon cessation of the rate-limiting effect of that circuit on an input signal. The time constant τ should be selected to have a relatively high value, for example τ=1.0 sec., when the frequency interval range of interest is 1–10 rad/sec, whereas at a higher frequency range of 10–100 rad/sec the time constant τ should be a considerably smaller value, for example τ=0.1 sec.

It is obvious and should be appreciated that the concept of the invention cannot be regarded as being restricted to the embodiment shown in the drawing, or to the example described above, but may be varied in many ways within the scope of the idea of invention. Thus, while a low-pass filter of the first order is specified in the preferred embodiment, this is done for the sake of simplicity, and it should be quite clear that other types of asymptotically stable feed-back filters may also be used.

The primary rate limiting circuit 1 will meet the three requirements for phase compensation hereinabove identified if the input signal to the device contains no high-frequency disturbance signals. However, if such high-frequency signals are present, the circuit 1 may block the transmission of desired low frequency signals. Such high frequency disturbances may be caused, for example, by aeroelasticity of the airframe due to external loads in an unusual configuration, damage, or sensor errors. In this context "high-frequency" is defined as frequencies above the bandwidth of the control system.

In order to eliminate the adverse influence of such a high-frequency disturbance signal contained in the input to a device according to the invention, the inventive structure should also be able to meet the following additional requirement:

D. To avoid or reduce the blocking effect for low frequency signals when high-frequency disturbances are present.

In that regard, the third requirement (C) for phase compensation hereinabove identified can be further specialized by meeting the following additional requirements on the circuit:

E. Not to impose rate limiting of the output signal unless the input signal has a rate exceeding the specified limit, and F. to restrict the output signal such that it does not have a rate exceeding the specified limit.

Figure 2:
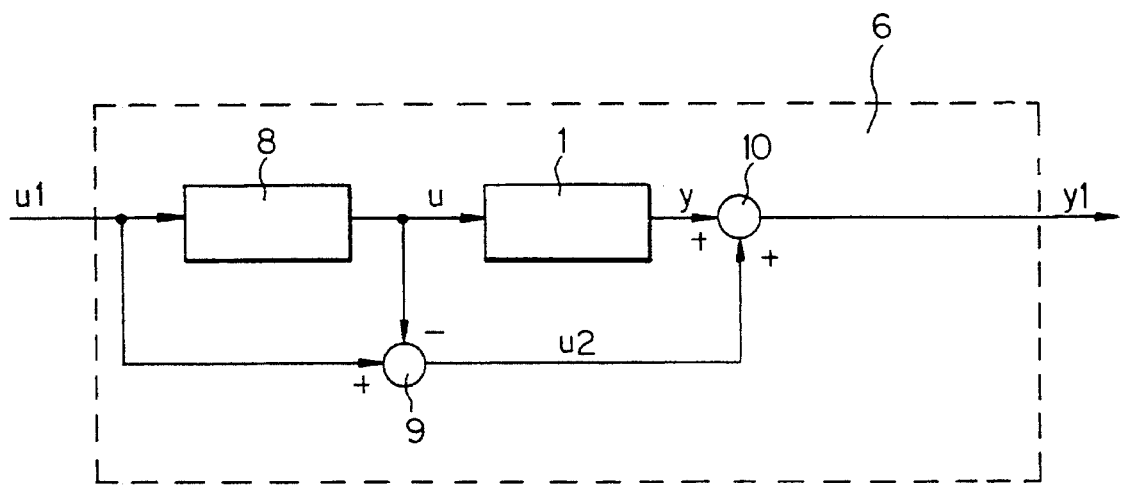
FIG. 2 shows a schematic block diagram of a second embodiment of a device according to the invention.

In FIG. 2 applicants disclose a second embodiment of the invention, which meets some of the above additional requirements.

Referring now to FIG. 2, illustrated therein is a second embodiment of the invention, arranged to limit a disturbing effect of high-frequency disturbance signals contained in the input signal. The embodiment of FIG. 2 shows a modified (combined) circuit 6, including the primary rate limiting circuit 1 and a low pass filter 8 connected in series with the input of circuit 1, for eliminating the high-frequency portion of an signal u1 inputted to the combined circuit 6. Combined circuit 6 further includes a third adder 9 and a fourth adder 10 in combination with the primary rate limiting circuit 1.

Towards that end, the low-pass filter 8 may be a first order low pass filter given by the transfer function:

$$G(s)=1/(s\tau_1+1)$$

For constant input signals the low pass filter shall have an output equal to the input signal, such that the above mentioned difference signal equals zero.

The time constant $\tau_1$ in the low pass filter 8 is chosen such that signals above a certain frequency, $1/\tau_1$ rad/s, are treated as high frequency signals and thus are only rate limited and not phase compensated. Signals below this frequency are both rate limited and phase compensated.

Preferably, $\tau_1$ is typically chosen to be smaller than τ of the feed-back low-pass filter 3 of the primary rate limiting circuit 1, previously discussed. This is because phase compensation is obtained at frequencies around 1/τ rad/s and these frequencies should then not be bypassed through the high-frequency path. That is, the low pass filter 8 should not attenuate frequencies where phase compensation is required to occur. Thus, in accordance with the preferred embodiment, the time constants should satisfy the following relation:

$$1/\tau<1/\tau_1, \text{ i.e. } \tau_1<\tau$$

In operation, the input signal u1 is fed to the low-pass filter 8 as well as to the third adder 9, which also receives the output signal u of the low-pass filter. This output signal u is also provided as the input signal to the primary circuit 1. Adder 9 generates a difference signal u2 representing the difference between the input signal u1 and the signal u. This difference signal u2, which is formed by subtracting the value of the signal u from the value of the signal u1, is fed together with the output signal y from the primary rate limiting circuit 1 to the fourth adder 10, to form a sum signal y1, which is the output signal of the combined circuit 6. As mentioned above, the primary rate limiting circuit 1 executes rate limiting and phase compensation only on the low-frequency part of the input signal, whilst there is no rate limiting of the output signal. Thus the above noted requirement F is not satisfied.

However, it is desirable to use phase compensation only on the low frequency part of the input signal, while providing rate limiting for high frequencies without phase compensation. It is also desirable to meet requirement F, i.e., to restrict the output signal such that it does not have a rate exceeding the specified limit. Toward that end, applicants' third embodiment (shown in FIG. 3) provides a second rate limiter, in an embodiment which assures equal rate limits for the time derivative of an incoming signal and the output signal.

Figure 3:
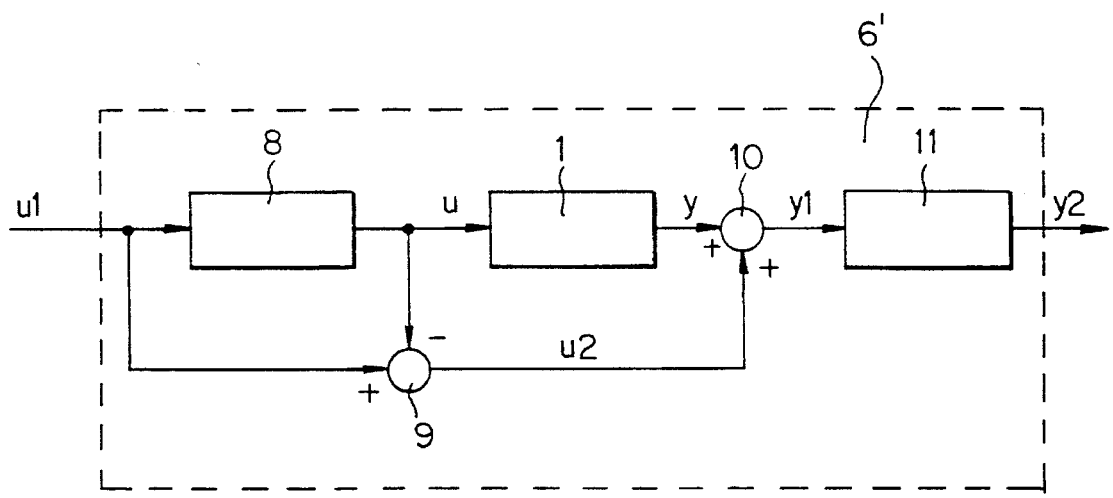
FIG. 3 shows a schematic block diagram of a third embodiment of a device according to the invention.

There is thus shown in FIG. 3 a preferred, third embodiment of a device according to the invention, for cases where the input signal contains a high-frequency disturbing signal part.

In this embodiment, very little of the properties of the primary rate limiting circuit is lost. Moreover, as will be appreciated from the illustrated circuit, requirement F mentioned above, that the output signal shall be restricted such that it does not have a rate exceeding the specified limit, is met.

As is illustrated in FIG. 3, the combined circuit 6 has been further modified as circuit 6'. The further modified circuit 6' includes a second rate limiter 11, added for rate limiting the time derivative of the signal y1, thus providing a rate limited output signal y2 from the further modified circuit 6'. The second rate limiter 11 is a conventional rate limiter, of the same type as the rate limiter 2 used in the primary rate limiting circuit 1. Preferably, the first and second rate limiters have equal rate limits. If rate limiting occurs in the second rate limiter 11, this is due to the high-frequency part of the input signal, i.e. the signal u2, which is not to be phase compensated.

Figure 4:
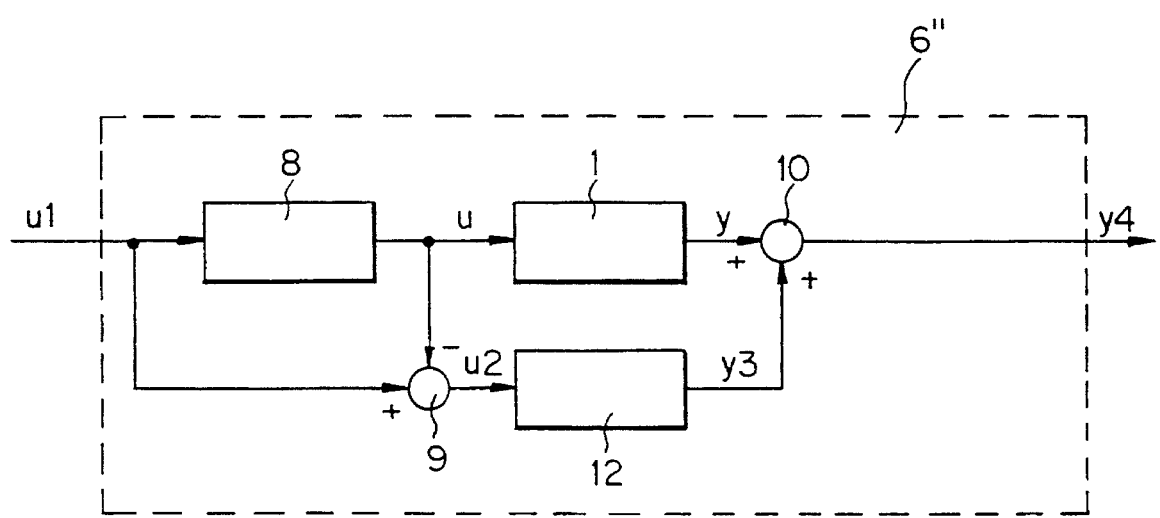
FIG. 4 shows a schematic block diagram of a fourth embodiment of a device according to the invention.

FIG. 4 illustrates an alternate approach to meeting the requirement set forth at "F" above, and shows a fourth embodiment of the invention, in which the circuit 6' is still further modified and shown as a circuit 6". As shown therein, the added rate limiter, denoted by reference numeral 12, only limits the high-frequency part u2 of the input signal u1 to produce a rate limited signal y3. In this embodiment, two rate limited signals, y and y3, are added in the fourth adder 10 to produce a rate limited output signal y4.

While the fourth embodiment provides an improvement over the prior art, it is appreciated that the embodiment of FIG. 3 is more effective than the fourth embodiment of FIG. 4. Specifically, in FIG. 3 the series connected circuits 1 and 11 have equal rate limits, namely the specified rate limit, in order to provide the specified rate limit for the output signal y2. However, in FIG. 4 the two circuits 1 and 12 are connected in parallel. Thus, each of these circuits must have a smaller rate limit than the specified rate limit, so that the sum of these rate limits equals the specified rate limit, in order for the output signal y4 to be within the specified rate limit. E.g. the first circuit 1 may have a rate limit set to 80% of the specified rate limit and the circuit 12 must then have the rate limit set to 20% of the specified rate limit, in order for the output signal y4 from the circuit 6" not to exceed the specified rate limit.

If the rate limited signals have maximum rates but opposite direction, then the output signal y4 from circuit 6" only has 60% of the specified rate. For example, if y has a positive rate at 80% of the limit and y3 has a negative rate at 20% of the limit, then y4 has a positive rate at 60% of the limit. It can also be demonstrated that the device according to the fourth embodiment may start rate limiting an input signal which is close to, but does not exceed, the specified rate limit. Thus, as either the high-frequency signal u2 or the low frequency signal u is rate limited, at 80% and 20% of the specified rate limit respectively for example, the fourth embodiment does not satisfy the above mentioned requirement "E". In such cases the third embodiment mentioned above does not modify the input signal.

Figure 6:
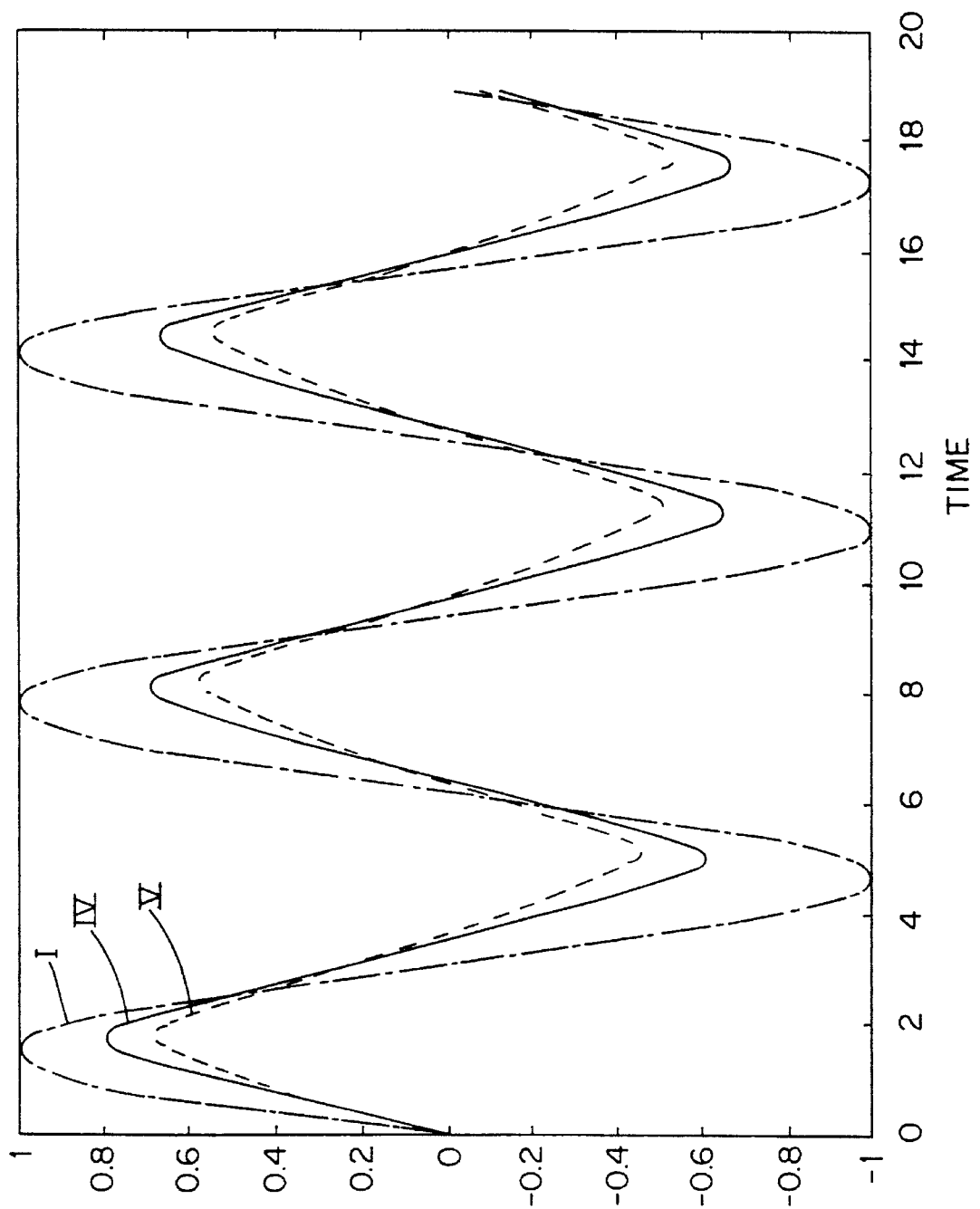
FIG. 6 illustrates the phase compensation of the third and fourth embodiments of the invention.

Referring now to FIG. 6, curve IV shows the phase compensating effects of the third preferred embodiment, and curve V shows the effects of the fourth embodiment, for comparison. In FIG. 6, the input signal is represented by curve I. Upon comparison with the curves of FIG. 5, it is apparent that (for this input signal) the third embodiment provides an output signal which is nearly identical to the output signal of the first embodiment. It should be noted, however, that with another input signal, the difference between the outputs of the first and third embodiments may be somewhat larger. FIG. 6 also shows that the fourth embodiment provides an output signal V which has a lower amplitude than, and increased phase difference with, the input signal of curve I, and is thus inferior to the third embodiment.

Figure 7A:
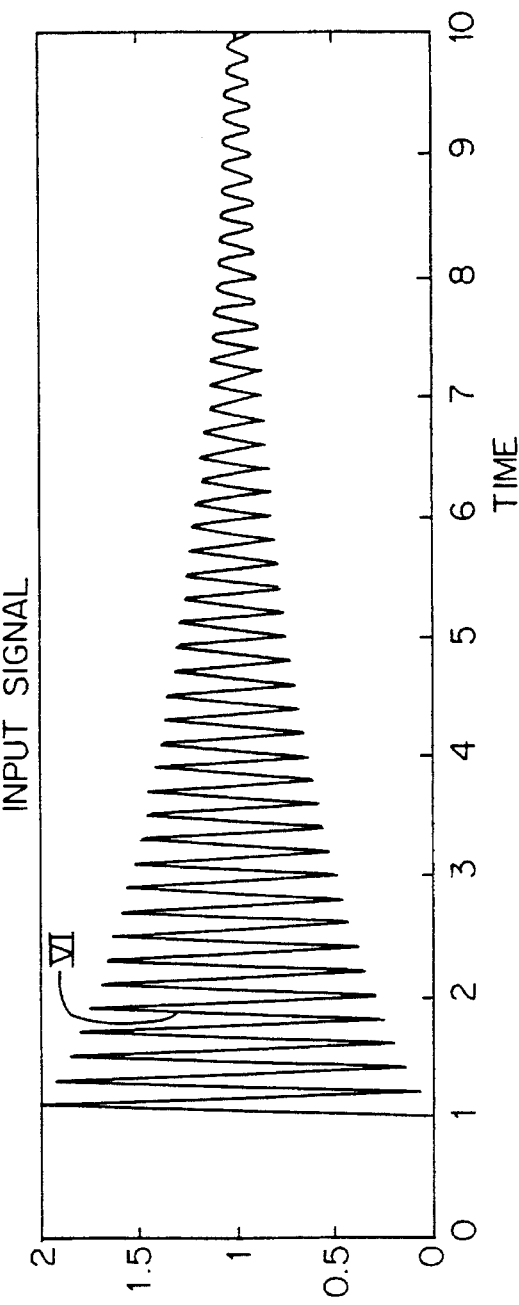
FIG. 7a shows an example of a high-frequency signal inputted to a rate limiter device, and to the first and third embodiments of the invention.
Figure 7B:
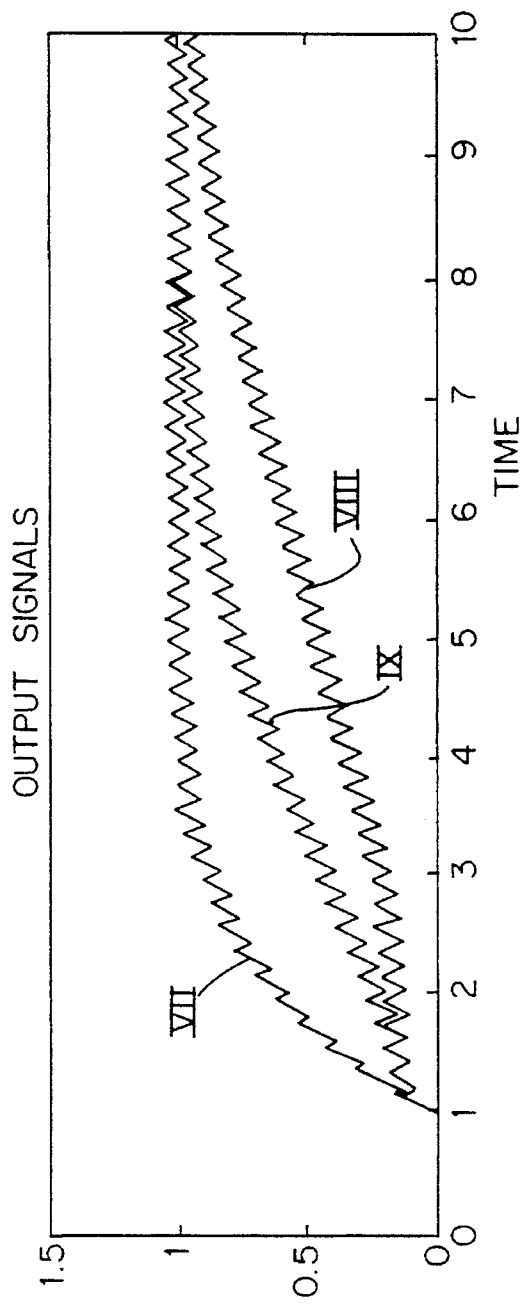
FIG. 7b shows output signals, corresponding to the input signal of FIG. 7a, from a rate limiter device and from the first and third embodiments of the invention.

To check the attenuation of high-frequency disturbing signals, an experimental set up was used, and the result of the investigation is illustrated in FIGS. 7a and 7b. Therein, an input high-frequency signal is shown in curve VI in FIG. 7a. Output signals from several different circuits are shown in FIG. 7b. Specifically, an output signal from a conventional rate limiter is shown in curve VII, an output signal from a primary rate limiting circuit 1 according to the first embodiment of the invention is shown in curve VIII, and an output signal from the third embodiment of the invention is shown in curve IX. As is apparent from the curves of FIG. 7b, the output signal from a conventional rate limiter rises to a constant level with the shortest delay of time. In this respect, the third embodiment is better than the first embodiment.

It is clearly noticeable that, at the end of the experiment, i.e., at a time of approximately 8–10 secs, all three output signals have the same phase. Thus, no phase compensation has been obtained at the disturbance frequency of any of the devices.

It should be appreciated that, by varying the time constant τ1 of the low-pass filter 8, the response of the third embodiment can be adjusted to approach the response of the conventional rate limiter as shown in curve VII, or the response of the first embodiment of the invention as shown in curve VIII. Specifically, a smaller time constant τ1 adjusts curve IX towards curve VIII, since higher frequencies will then be rate limited with phase compensation by the primary rate limiting circuit 1. A larger time constant τ1 adjusts curve IX towards curve VII of the conventional rate limiter, since lower frequencies will bypass the phase compensation of circuit 1 and will be rate limited only by the conventional rate limiter 11.

The foregoing description of the preferred embodiment of the invention has been presented for purposes of illustration and description. It is not intended to be exhaustive or to limit the invention to the precise forms disclosed, since many modifications or variations thereof are possible in light of the above teaching. Some modifications have been described in the specification, but are only illustrative of the possible modifications. All such modifications and variations are within the scope of the invention and are equivalent thereto. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

We claim:

1. In a control system of a vehicle for providing an output signal (y) having a time derivative which is limited in relation to a time derivative of an input signal (u) if the time derivative for the input signal (u) exceeds a predetermined value, the improvement comprising means for providing phase compensation in the control system, including:

primary rate limiting circuit means (1) for providing a signal (x) and for arranging said signal (x) to have a time derivative which is not limited in relation to the time derivative for the input signal (u), including:

difference means for forming a difference signal ($\epsilon$) between the output signal (y) and the signal (x), feedback means for feeding back said difference signal ($\epsilon$) to the input of said primary rate limiting circuit means, said feedback means including an filter means (3) for producing a feedback signal ($\delta$), and adding means (4) for adding said feedback signal ($\delta$) to the input signal (u) and for outputting said signal (x).

2. A control system according to claim 1, wherein said filter means comprises an asymptotically stable low pass filter.

3. A control system according to claim 1, wherein said filter means comprises a first order low pass filter having an amplification parameter K and a time constant $\tau$.

4. A control system according to claim 1, wherein said amplification parameter has a value in a range of 5 to 10.

5. A control system according to claim 1, wherein said control system operates for controlling an aircraft.

6. In a control system of a vehicle for providing an output signal (y) and including primary circuit means (1) including rate limiter circuit means (2) for limiting a time derivative of the output signal (y) relative to a time derivative of an input signal (u) if the time derivative for the input signal (u) exceeds a predetermined value set by the rate limiter circuit means (2), the improvement wherein said primary circuit means (1) further includes means for providing phase compensation in the control system, including:

first adding means (5) connected for receiving said output signal (y) as one input thereof and a signal (x) in said primary circuit means (1) as a second input thereof, said first adding means operating for forming a difference signal ($\epsilon$) between said output signal (y) and said signal (x);

said signal (x) having a time derivative which is not limited in relation to the time derivative for the input signal (u);

feed-back filter means (3) for feeding back said difference signal ($\epsilon$) as a feedback signal ($\delta$); and second adding means (4) for adding the input signal (u) to said feedback signal ($\delta$) from said feed-back filter means (3) to form said signal (x) and to provide said signal (x) as an input to the rate limiter circuit means (2).

7. A control system according to claim 6, further including high-frequency limiting means for limiting a disturbing influence of a high-frequency disturbance signal contained in the input signal, comprising:

low-pass filter means (8) connected for receiving the input signal, for eliminating said high-frequency disturbing signal from the input signal, and for providing a filtered input signal to said second adder means;

third adding means (9) for receiving said input signal and said filtered input signal, and for forming a difference signal (u2) between said input signal and said filtered input signal;

fourth adding means (10) receiving said difference signal (u2) and said output signal (y) and generating a sum signal, said fourth adding means obtaining a sum of said output signal (y) and said difference signal (u2) for providing said sum signal as a modified output signal (y1) of said control system.

8. A control system according to claim 7, further comprising:

second rate limiter circuit means (11) for limiting the time derivative of a signal inputted thereto;

said second rate limiter circuit means (11) receiving said modified output signal (y1) from said fourth adding means (10) as an input signal, and outputting a further rate-limited output signal (y2) as an output of said control system.

9. A control system according to claim 7, further comprising:

further rate limiter circuit means (12) for limiting the time derivative of a signal inputted thereto;

said further rate limiter circuit means (12) receiving said difference signal (u2) from said third adding means (9) as an input signal, and outputting a rate-limited difference signal (y3) to said fourth adding means (10); said fourth adding means (10) connected for generating said sum signal as a sum of said rate-limited difference signal (y3) and said output signal (y) to provide an output signal (y4) as an output of said control system.

10. A control system according to claim 6, wherein said feed-back filter means comprises a low pass filter.

11. A control system according to claim 6, wherein said feed-back filter means comprises a first order low pass filter having an amplification parameter K and a time constant $\tau$.

12. A control system according to claim 6, wherein said amplification parameter has a value in a range of 5 to 10.

13. A control system according to claim 6, wherein said control system operates for controlling an aircraft.

14. A method for providing phase compensation in a control system of a vehicle providing an output signal (y) from a primary rate limiting circuit, the output signal having a time derivative which is limited in relation to a time derivative of an input signal (u) to the primary rate limiting circuit if the time derivative for the input signal (u) exceeds a predetermined value, comprising the steps of:

obtaining a signal (x) present in the primary rate limiting circuit, said signal (x) having a time derivative which is not limited in relation to the time derivative for the input signal (u), forming a difference signal ($\epsilon$) between the output signal (y) and the signal (x), filtering said difference signal ($\epsilon$) for producing a feedback signal ($\delta$), and adding said feedback signal ($\delta$) to the input signal (u) for forming said signal (x).

* * * * *